United States Patent
Shimhi (10) Patent No.: US 8,175,874 B2
(45) Date of Patent: May 8, 2012

(54) PERSONALIZED VOICE ACTIVITY DETECTION

(76) Inventor: Shaul Shimhi, Tel-Mond (IL)

( * ) Notice: Subject to any disclaimer, the term of this patent is extended or adjusted under 35 U.S.C. 154(b) by 925 days.

(21) Appl. No.: 12/092,578

(22) PCT Filed: Jul. 18, 2006

(86) PCT No.: PCT/IL2006/000831
§ 371 (c)(1),
(2), (4) Date: May 5, 2008

(87) PCT Pub. No.: WO2007/057879
PCT Pub. Date: May 24, 2007

(65) Prior Publication Data
US 2008/0255842 A1    Oct. 16, 2008

Related U.S. Application Data

(60) Provisional application No. 60/597,213, filed on Nov. 17, 2005.

(51) Int. Cl.
*G10L 15/10* (2006.01)
(52) U.S. Cl. ........................ 704/240; 704/249; 379/88.04
(58) Field of Classification Search .......... 704/231–257; 379/88.04
See application file for complete search history.

(56) References Cited

U.S. PATENT DOCUMENTS

| | | | | |
|---|---|---|---|---|
| 4,038,503 A | * | 7/1977 | Moshier | 704/234 |
| 4,328,591 A | * | 5/1982 | Baghdady | 455/303 |
| 4,489,435 A | * | 12/1984 | Moshier | 704/244 |
| 4,720,802 A | * | 1/1988 | Damoulakis et al. | 704/233 |
| 5,572,623 A | * | 11/1996 | Pastor | 704/233 |
| 6,006,175 A | * | 12/1999 | Holzrichter | 704/208 |
| 6,011,853 A | * | 1/2000 | Koski et al. | 381/56 |
| 6,259,916 B1 | * | 7/2001 | Bourk et al. | 455/434 |
| 6,285,535 B1 | * | 9/2001 | Nakamura | 361/56 |
| 6,882,971 B2 | * | 4/2005 | Craner | 704/246 |
| 7,231,019 B2 | * | 6/2007 | Pascovici | 379/88.02 |
| 2003/0061036 A1 | * | 3/2003 | Garudadri et al. | 704/208 |

* cited by examiner

*Primary Examiner* — Abul Azad
(74) *Attorney, Agent, or Firm* — Law Office of Joseph L. Felber (57) ABSTRACT

A method of transferring a real-time audio signal transmission, including: registering voice patterns (or other characteristics) of on more users to be used to identify the voices of the users, accepting an audio signal as it is created as a sequence of segments, analyzing each segment of the accepted audio signal to determine if it contains voice activity (314), determining a probability level that the voice activity of the segment is of a registered user (320 & 322); and selectively transferring the contents, of a segment responsive to the determined probability level (324).

28 Claims, 9 Drawing Sheets

PERSONALIZED VOICE ACTIVITY DETECTION

RELATED APPLICATIONS

This application claims priority from U.S. provisional application No. 60/597,213 filed Nov. 17, 2005, the disclosure of which is incorporated herein by reference.

FIELD OF THE INVENTION

The present invention relates generally to voice activity detection and more specifically to automatic identification and transfer of voice activity of specific speakers.

BACKGROUND OF THE INVENTION

Voice activity detection (VAD) is the art of detecting the presence of voice activity, generally human speech, in audio signals. Voice activity detection is used in a wide range of systems handling audio signals for example systems dealing with: telecommunication, speech recognition, speaker verification, speaker identification, speaker segmentation, voice recording, noise suppression and others. In a telecommunication system voice activity detection can be used to implement different sampling rates based on the voice activity level detected, for example to raise/reduce the bandwidth when dealing with audio segments containing human speech. A speaker verification/identification system can be simplified by limiting processing to audio segments containing speech. A noise suppression system can use voice activity detection for comparing between segments with speech activity relative to segments without speech activity. In voice recording systems voice activity detection can be used to reduce the required storage space by limiting the recording to meaningful information (e.g. segments with speech activity).

Many voice controlled systems and/or applications are intended to receive voices from a single person or single group of people, and would function better if they actually receive only the voice or voices of the intended people, for example:
1. Speaker verification systems such as used by banks to authenticate the customer;
2. Voice activated appliances, which are trained to recognize specific voices and/or commands; and
3. Telephone tapping devices, which are interested in recording voices of specific people.

Likewise in telephone conversations any background noise or voices of other people not participating in the conversation can be considered noise, for example:
1. When talking on a speakerphone with other people talking in the background;
2. When talking on a public telephone on a noisy street;
3. When talking on a mobile telephone in a noisy environment;
4. In a call center with many agents speaking to different callers in the same room;
5. When talking on the telephone and not interested that the party on the other end will identify the speakers location, for example with a loudspeaker giving announcements in the background;
6. When conducting a conference call in a closed room and a person that is not participating in the conversation enters the room to deliver a verbal message to one of the participants.

Some systems attempt to transfer voice and eliminate noise in order to improve efficiency in dealing with the signal. In some cases more sophisticated input devices (e.g. extra microphones and/or sensors) are used in order to help differentiate between different speakers and/or noise.

U.S. patent application publication No. 2005/0033572 published Feb. 10, 2005 the disclosure of which is incorporated herein by reference describes apparatus and method of a voice recognition system for an audio-visual system. The system receives reflected sounds from an audio-visual system, noise and a user's voice and is configured to isolate the user's voice and compare it to voice patterns that belong to at least one model.

Japanese patent No. 11-154998 from Jun. 8, 1999 the disclosure of which is incorporated herein by reference, describes registering a voice print of a speaker, then during transmission a microphone collects a signal comprising the speakers voice and ambient noise. The signal is input to a comparing filter that extracts the voice of the speaker from the signal by comparing to the registered voice print.

There is however a basic problem in implementing a system as suggested in the Japanese patent. In implementing a system for determining if a specific audio signal is voice and if it matches a specific voice pattern of a specific speaker, statistical methods are used, providing a probability level of conformity. The determination is not an absolute process wherein a real-time signal being generated is passed through a processor, which instantaneously provides a clean output signal that includes only the speech of a specific speaker. The above determination requires, statistical analysis of each part of the evolving audio signal to determine if the part contains the specific speakers voice or not. In some cases further evaluation of the evolving audio signal may reverse a previous determination, for example an audio segment which was initially determined to probably be a specific speaker may later be determined not to be the specific speaker or vice versa. Generally, instantaneous transfer of the audio will introduce a high level of error in the output signal, leading to portions of the speech being cut off or transfer of a large portion of the background noise. In contrast the greater the delay introduced before providing a determination the more accurate the decision tends to be, however providing a determination with a delay of more than a small amount (e.g. more than 100 mili-seconds) will result in a conversation of unacceptable quality.

SUMMARY OF THE INVENTION

An aspect of an embodiment of the invention relates to a system and method of transferring audio data in real-time wherein only the voice of a registered user will be transferred. The system initially registers the voice patterns and/or characteristics of one or more users. The system then analyzes the audio data, segment by segment as it is created and transferred in real time. The system checks if a segment contains voice and if the voice is of a registered user.

In an exemplary embodiment of the invention, the system calculates a probability level that a segment representing voice is of a registered user and transfers the segment responsive to the determination. Optionally, if the probability is below a pre-selected threshold value the segment is blocked. In an exemplary embodiment of the invention, if the probability level is above a pre-selected value the segment is transferred. Optionally, if the probability level is less than a pre-selected value and greater than a threshold value the segment is transferred with the quality and/or strength of the signal adjusted according to the probability level, for example raising or lowering the volume.

In some embodiments of the invention, some previously blocked segments may be transferred responsive to a recalculation of their probability level when calculating the probability level of a proceeding segment. Optionally, the transferred blocked segments are transferred at a higher rate to prevent a delay in the flow of the segments.

There is thus provided in accordance to an exemplary embodiment of the invention, a method of transferring a real-time audio signal transmission, comprising, registering user characteristics of one or more users to be used to identify the voices of the users, accepting an audio signal as it is created as a sequence of segments, analyzing each segment of the accepted audio signal to determine if it contains voice activity, determining a probability level that the voice activity of the segment is of a registered user; and selectively transferring the contents of a segment responsive to the determined probability level.

In an exemplary embodiment of the invention, the segments are selected to comprise a single syllable. Optionally, the segments are selected to comprise an interval of the audio signal smaller than 0.1 seconds. In an exemplary embodiment of the invention, the selectively transferring comprises adjusting the quality level of the audio segment according to the determined probability level. Optionally, adjusting the quality level comprises raising or lowering the volume of the audio signal in the segment. In an exemplary embodiment of the invention, the selectively transferring comprises transferring previously blocked segments responsive to the determination for a consecutive segment. Optionally, the previously blocked segments are transferred at a higher rate than the standard transfer rate of segments. In an exemplary embodiment of the invention, the probability level of a segment is affected by the selective transfer of segments prior to the current segment.

Optionally, the method further comprises filtering out noise from each segment before analyzing the segment. In an exemplary embodiment of the invention, the method comprises filtering out noise from each segment after analyzing the segment. Optionally, the method further comprises performing source separation to the signal in a segment creating multiple segments before analyzing the segment and analyzing the multiple segments independently. In an exemplary embodiment of the invention, the method further comprises analyzing the strongest signal in a segment comprising multiple audio signals, while taking into account prior segments. Optionally, the method further comprises inserting an audio signal into a segment to indicate amendments to the segment. In an exemplary embodiment of the invention, the transferring is through a communication system. Optionally, the characteristics comprise voice patterns of the user.

In an exemplary embodiment of the invention, the characteristics comprise general information about the user. Optionally, the selectively transferring allows voice activity of any user. In an exemplary embodiment of the invention, the selectively transferring allows voice activity of a group of users with a common characteristic. Optionally, the selectively transferring reduces bandwidth of transmissions through a communication network. In an exemplary embodiment of the invention, the probability level becomes more accurate as the audio signal is processed.

There is thus additionally provided according to an exemplary embodiment of the invention, a system for transferring a real time audio transmission, comprising, a processor to process data of the real time audio transmission and control the system, a working memory to serve as a work area for said central processing unit, a database memory to store data provided to the system for processing by said central processing unit, a channel interface to accept an audio signal for processing and transfer the processed audio signal to a receiver, a user interface to communicate with the user, wherein the system is adapted to, register characteristics of one or more users to be used to identify the voice of the users, accept via the channel interface an audio signal as it is created as a sequence of segments, analyze with the central processing unit each segment of the accepted audio signal to determine if it contains voice activity, determine a probability level that the voice activity of the segment is of a registered user, and selectively transfer the contents of a segment responsive to the determined probability level. Optionally, the system provides an indication at a user communication device if it is activated. In an exemplary embodiment of the invention, the indication gives indication if the user is recognized as a registered speaker. Optionally, the user can toggle the system on and off.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with the same or similar number in all the figures in which they appear, wherein.

DETAILED DESCRIPTION

Overview

Figure 1:
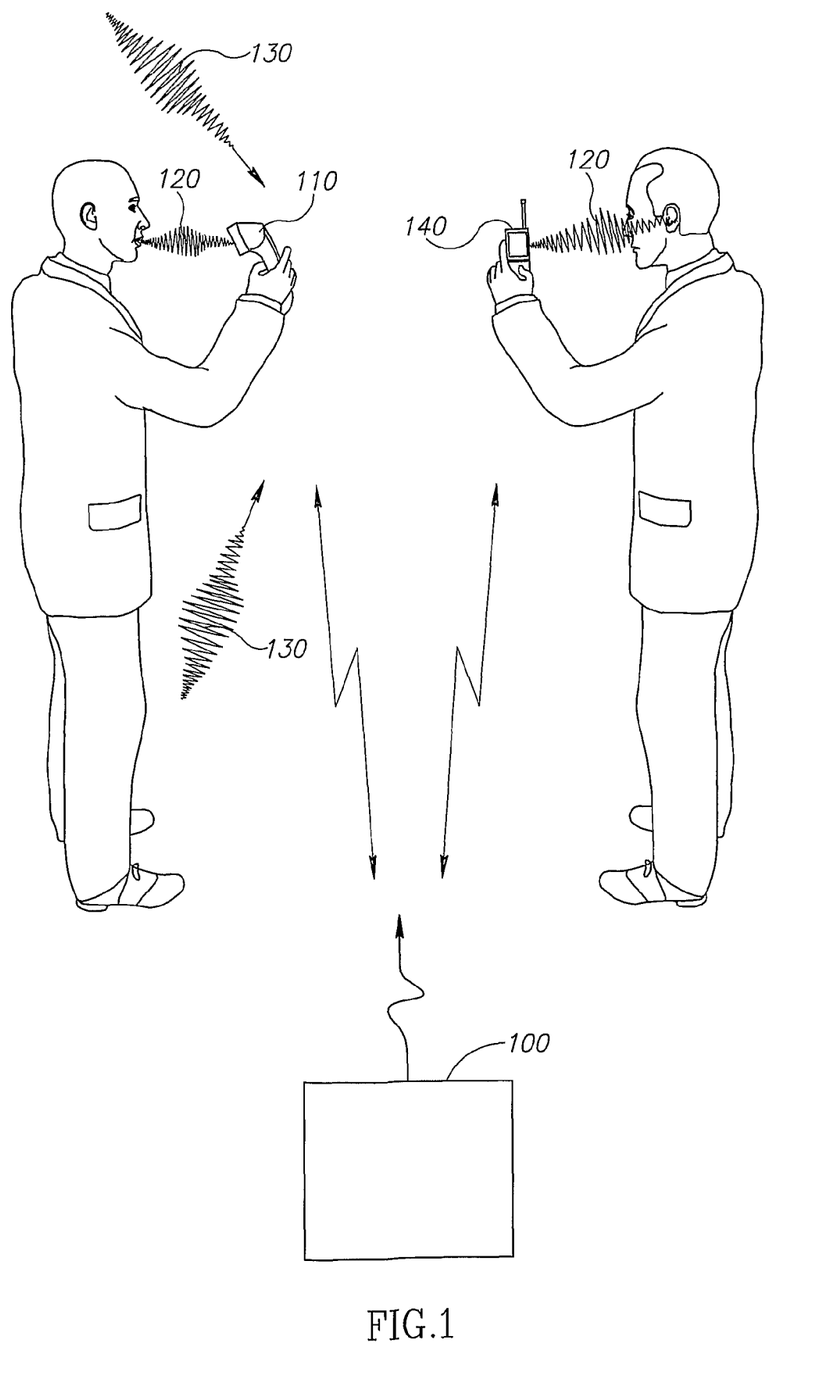
FIG. 1 is a schematic illustration of implementation of a personalized voice detection system, according to an exemplary embodiment of the invention.

FIG. 1 is a schematic illustration of implementation of a personalized voice detection system, according to an exemplary embodiment of the invention. In an exemplary embodiment of the invention, two users, user A and user B conduct a conversation over telephones 110 and 140 respectively. Optionally, user A produces an audio signal 120 comprising speech, which is received by telephone 110 for transmission to telephone 140 at user B. In some cases, other audio signals 130 in the vicinity of user A are also received by telephone 110. Other signals 130 may be noises (e.g. dogs barking, musical instruments playing, water running, a toilet flushing)

or may be other people speaking. In some embodiments of the invention, additional noises that originate from the communication equipment and/or the communication network may also interfere with audio signal 120.

In an exemplary embodiment of the invention, user B is interested in hearing audio signal 120 of user A without audio signals 130 of the noise surrounding user A. Alternatively or additionally, user A is interested that user B receive audio signal 120 and not hear audio signals 130, which for example may disclose details that user A is not interested in disclosing, for example the current location of user A (e.g. not at work) or current activity of user A (e.g. watching a movie). In an exemplary embodiment of the invention, the conversation originating from user A will use a personalized voice detection system 100 which transfers only voices of users that are registered to use system 100 and suppresses all other sounds.

In an exemplary embodiment of the invention, user A will register for use of system 100 so that user A's voice signals will be transferred. Optionally, user B is essentially provided only with the voice of user A. In an exemplary embodiment of the invention, system 100 can be implemented as a uni-directional system or a bi-directional system. Additionally, system 100 can be implemented to transfer the voice signal of a single user or multiple users. Further additionally, system 100 may interface between two or more users or between a user and a machine, for example system 100 may serve as a filter for receiving audio signals to activate a voice activated device so that the machine will receive a clean voice signal, wherein only the voice of registered users will reach the machine.

In some embodiments of the invention, system 100 enhances system performance by reducing bandwidth requirements since it provides a filtered signal. Optionally, a clean voice signal and/or a reduced size voice signal can reduce processing time since the network has less data to handle.

Positioning

Figure 2:
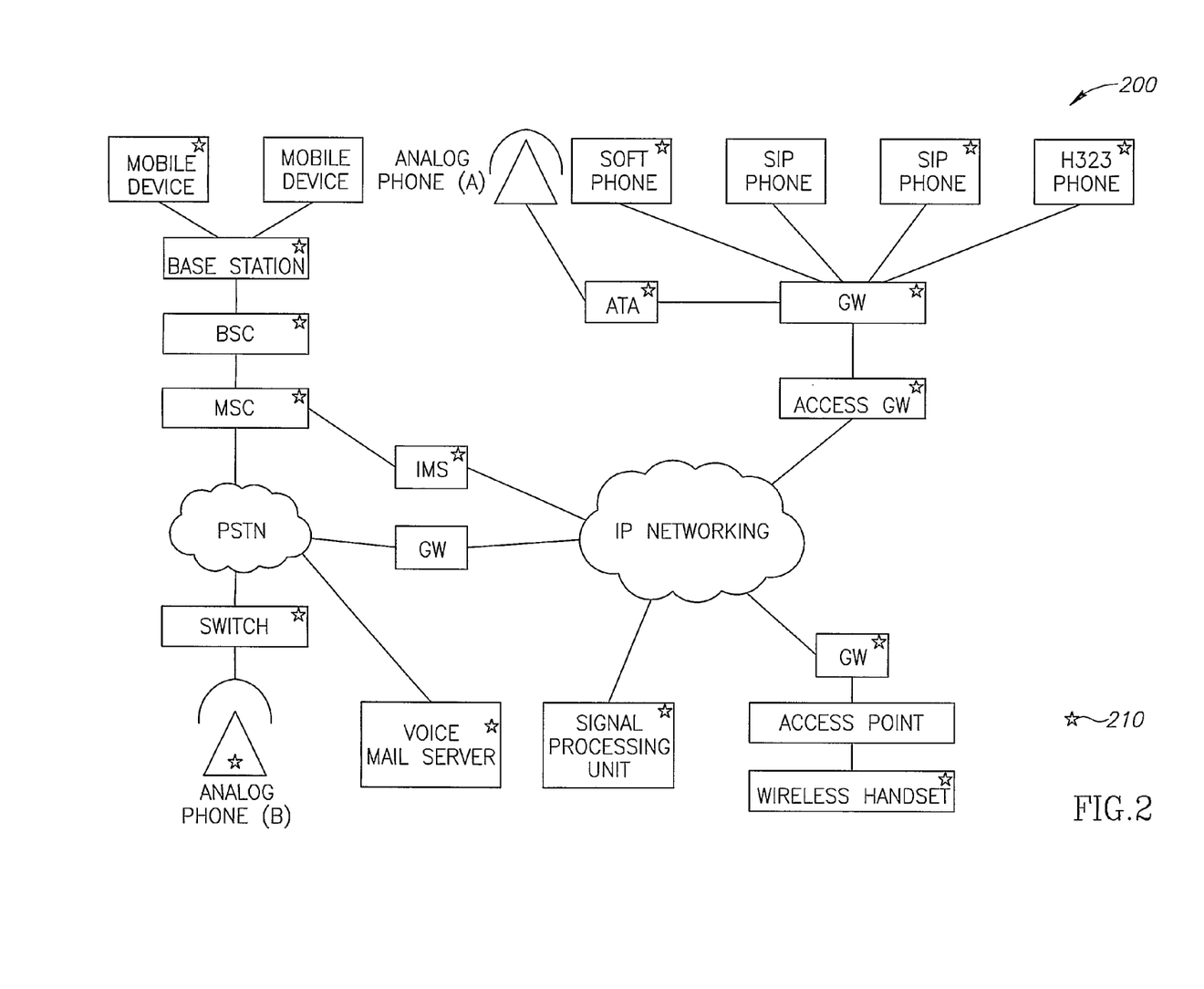
FIG. 2 is a schematic illustration of a communication network and optional positions for deploying a personal voice detection system, according to an exemplary embodiment of the invention.

FIG. 2 is a schematic illustration of a communication network 200 and optional positions for deploying a personal voice detection system, according to an exemplary embodiment of the invention. In FIG. 2 various optional positions for implementing a personal voice detection system are marked with a star 210. Optionally, any device in the communication network through which a transmitted audio signal is transferred can be altered to accommodate system 100, for example a base station of a mobile telephone network, a multiple control unit (MCU), a mobile switching center (MSC), a mobile telecommunications switching office (MTSO), a public switched telephone network server (PSTN), a voice mail server, a signal processing unit, a telephone of any type (e.g. mobile telephone, analog telephone, soft phone, SIP telephone, H323 telephone), gateways, switches, access points, routers, communication servers, and proxy servers. In some embodiments of the invention, system 100 is positioned directly in the transmitting device (e.g. telephone) in order to reduce transmission bandwidth requirements by sending a clean voice signal and/or deal with the signal as it is created without distortions, which may incur during the transfer of the signal. Alternatively, system 100 may be positioned directly in the device receiving the audio data, for example to serve as a filter that provides only speech data of authorized users to arrive at the device, thus simplifying the functions of the device.

In some embodiments of the invention, system 100 may comprise more than one unit with each part residing in a different location, for example the processing unit may be in one location and a database for recording information of a registered user may be located in a different location.

In some embodiments of the invention, a conversation may be transmitted through a path with more than one system 100. Optionally, only one system 100 is activated at a time to filter the audio transmissions. In some embodiments of the invention, more than one system 100 can be used sequentially to verify accuracy of the filtering process preformed by the previous units.

Implementation

Figure 3A:
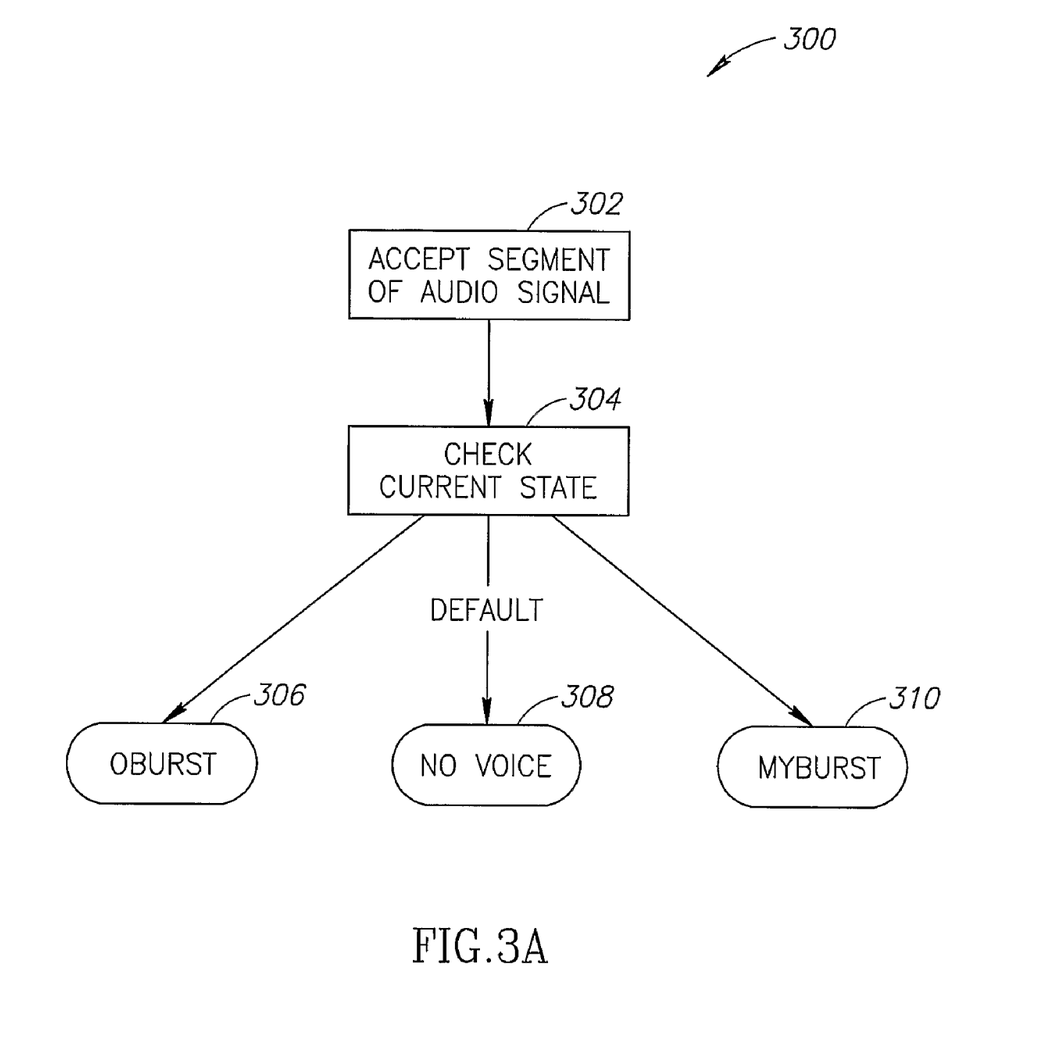
FIG. 3A is a flow diagram of the process of analyzing an audio segment, according to an exemplary embodiment of the invention.

FIGS. 3A-3D are flow diagrams of the process of analyzing an audio segment, according to an exemplary embodiment of the invention. Typically a speaker speaks in bursts of speech followed by a pause and/or a response from the opposing party or device. This process is typically repeated throughout a conversation. Each burst can be viewed as a sequence of one or more audio segments. FIG. 4 is a schematic illustration of a buffer 400 storing previous segments of an audio signal, according to an exemplary embodiment of the invention. FIG. 4 illustrates a currently being created audio burst 420 with a current segment 410. T1 and T2 define previously received bursts 430.

In an exemplary embodiment of the invention, every audio segment received 410 is analyzed by system 100 to determine if it is voice and if it is one of the registered users voice that needs to be transferred or if it a foreign sound that should be suppressed, for example speech of a none registered person. In order to determine if an audio segment is voice of a registered user system 100 takes into account the state of system 100 when receiving the segment and the state of previously accepted segments, for example is segment 410 the start of a burst of speech or not, and if the previous segments were determined to be a registered users speech or not.

In an exemplary embodiment of the invention, the size of a segment may be a piece of an audio signal measured by an absolute time interval or may be the size of a single syllable or more or less than a single syllable of speech. Optionally, segment 410 will be short (e.g. less than 100 mili-seconds) to prevent delay in transfer of the audio signal, for example if system 100 analyzes full words there would be a noticeable delay when conducting a live conversation.

In an exemplary embodiment of the invention, segment 410 may comprise:

1. A registered user's voice without additional sounds;
2. A registered user's voice with additional voices and/or sounds, which will be referred to as noise;
3. No voice just additional sounds;
4. Voice not belonging to the registered user; or
5. Voices belonging to more than one registered user with/without additional voices, which will be referred to as noise.

In an exemplary embodiment of the invention, system 100 may pre-process each segment to remove sounds which are clearly not a person's voice before analyzing the segment to determine if it contains a registered user's voice. Alternatively or additionally, system 100 may process each segment after analyzing the segment to remove unwanted sounds, which co-reside in segment 410 with the voice of a registered user. In some embodiments of the invention, voice includes only speech of a person. Alternatively, voice includes any sound coming from a person's mouth, for example laughter and a cough.

Optionally, system 100 uses long term analysis of audio signal 420 (e.g. burst by burst) with short term analysis (e.g. segment by segment) to clean out the registered users voice signal. As an example system 100 may use long term analysis to identify the voices of the registered users and learn the characteristics of the other noises appearing in the signal. Optionally, the other noises can then be identified more easily when analyzing each segment and be removed when they appear in future segments as the conversation advances. Thus initially, the receiver of the conversation may hear foreign sounds, which will quickly disappear as the conversation advances. Optionally, system 100 can be used to remove echo from a conversation.

Another method that can be used by system 100 to clean out the audio signal is called a winner filter, wherein the noise is assumed to be mainly stationary. When the noise appears by itself its characteristics are learnt and subsequently removed from the proceeding segments.

In some embodiments of the invention, when a signal includes sounds from multiple sources (e.g. multiple speakers), system 100 may analyze the strongest signal in segment 410 (and previous segments) to determine if to transfer the segment or not. Alternatively or additionally, source separation techniques that are known in the art are used to divide up each segment to multiple segments for each audio source. Optionally, the segments of each audio source can then be analyzed separately, for example when multiple people are speaking system 100 can analyze the voice of each speaker separately to determine if it is of a registered user and should be transferred or suppressed. Optionally, source separation can be performed by forming separate distinct continuous signals from a given signal. In some methods source separation requires knowledge of the characteristics of one of the signals (e.g. the registered user) or alternatively, additional hardware such as extra microphones near the audio source are required.

In some embodiments of the invention, the frequencies belonging to the registered user can be determined and frequencies that could not belong to the registered user are removed from audio segment 410. Optionally, other known noise filtering methods can also be implemented to clear out noise from the audio signal being generated.

In an exemplary embodiment of the invention, system 100 is provided with a database of common sounds which are suppressed if identified in the analyzed segments. Optionally, system 100 records new sounds for suppression in the database, based on the activity of system 100.

In some embodiments of the invention, system 100 attempts to completely suppress unwanted sounds. Alternatively, system 100 allows the user to select a suppression level by which unwanted sounds will be suppressed, so that the user may control the level of the background noise. In some embodiments of the invention, the suppression level is selected automatically, for example to achieve a noise level proportional to the volume of the voice of the registered user. In some embodiments of the invention, system 100 additionally enhances the quality (e.g. volume) of the voice of registered users.

In some embodiments of the invention, when background noises are eliminated system 100 provides an audio signal, for example a low beep at the beginning or during burst 420 to signify to the listener that the quality of the voices may be low and hard to understand due to noises that previously interfered with the voice signal, even if the noises have been removed.

In some embodiments of the invention, system 100 provides an indication (e.g. a graphical indication) on the communication device (e.g. 110, 140) if system 100 is activated. Optionally, the speaker may receive an indication if system 100 recognizes him/her as a registered speaker.

In an exemplary embodiment of the invention, various parameters are used independently or in combination to determine if a specific segment comprises voice and matches the voice of a specific user. An example of such a parameter includes details such as the pitch of the speaker. Another parameter that may be used is the average long-term LPC spectrum. Additionally, pronunciation of specific letters assuming a specific language is dealt with can also be used to identify the speaker. Optionally, some parameters (e.g. pitch) provide a determination on a short term piece of an audio signal (e.g. a segment), whereas others (e.g. long-term LPC) require longer term pieces of the audio signal (e.g. a burst of speech). In an exemplary embodiment of the invention, system 100 attempts to provide a short term determination and improve it by long term determinations as described below. Optionally, as mentioned above long term determinations are used additionally to identify background noise so that they can be removed.

In an exemplary embodiment of the invention, as shown in flow diagram 300, system 100 initially accepts (302) segment 410 of an audio signal. Optionally, system 100 checks (304) what the current state of analysis is and processes the segment accordingly. If the current status is that no voice has been detected so far, or if this is a first segment, processing of the next segment 410 is transferred to state 308 "novoice". Alternatively, if the previous segment was determined to be voice from a burst of speech from a registered user then processing is transferred to state 310 "myburst" (voice of a registered user). Otherwise, if the previous segments were determined to be voice from a non-registered user then processing is transferred to state 306 "oburst" (voice of "other" than a registered user (i.e. not belonging to a registered user)).

Figure 3B:
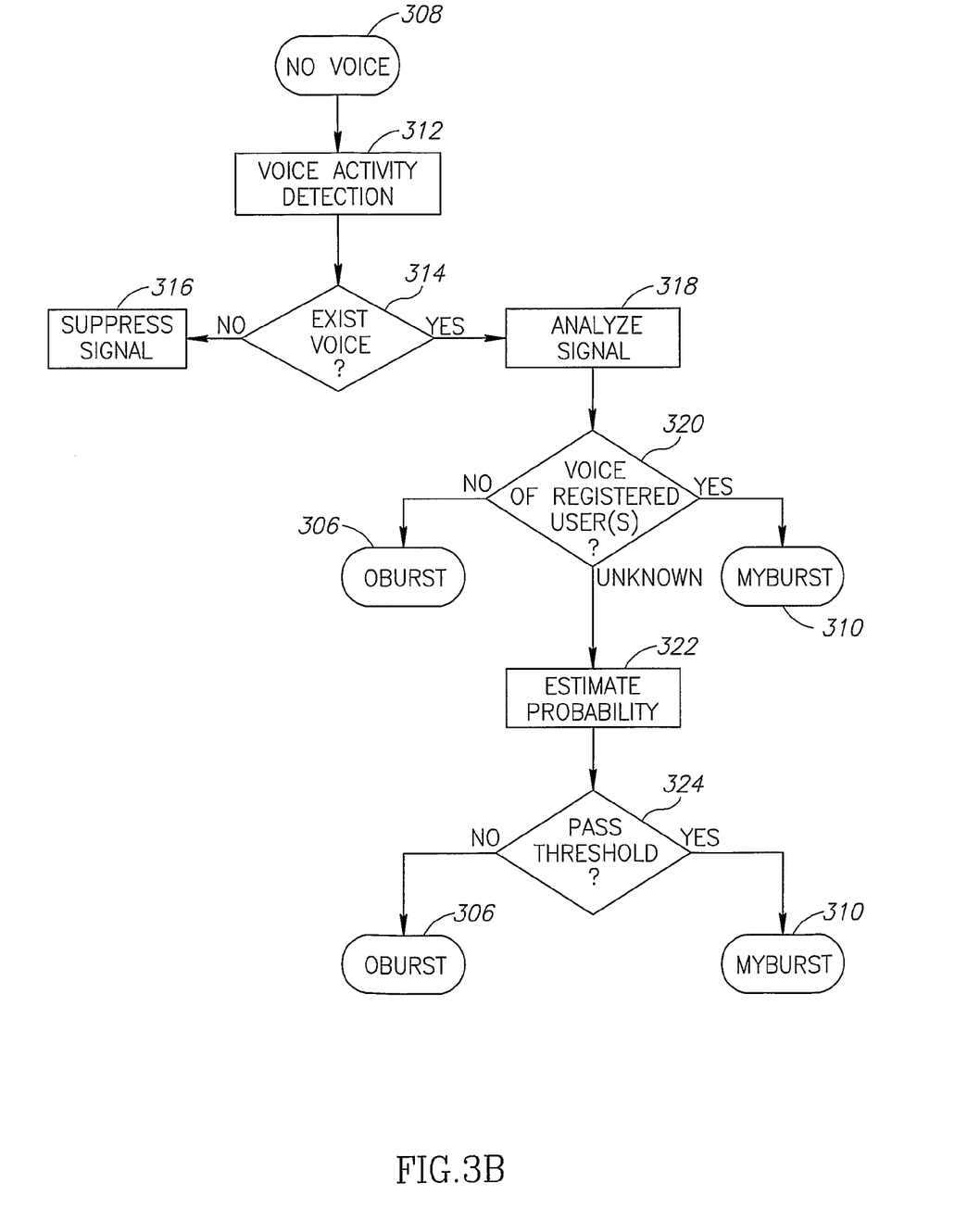
FIG. 3B is a flow diagram of the process of analyzing an audio segment before voice is detected, according to an exemplary embodiment of the invention.
Figure 4:
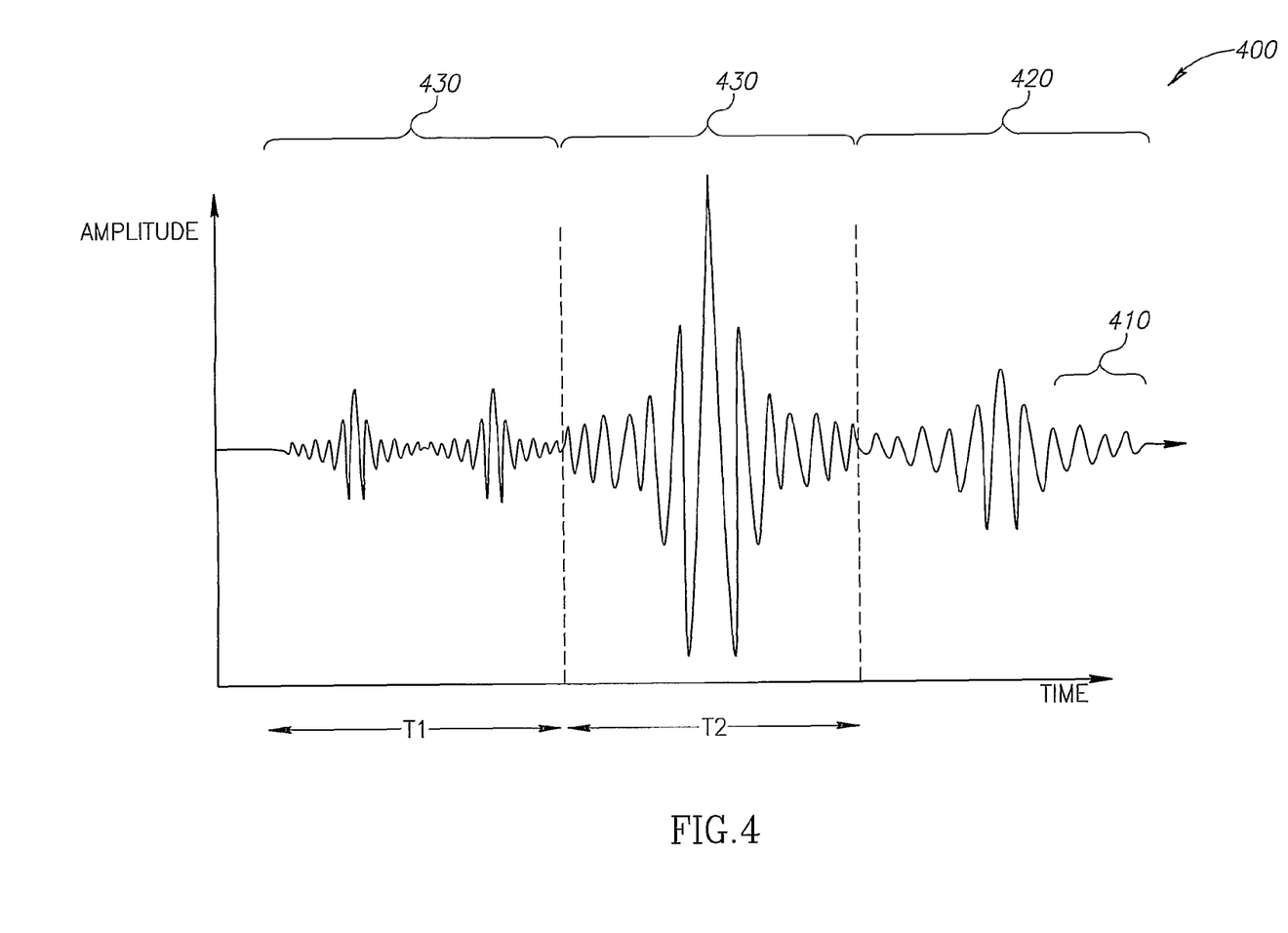
FIG. 4 is a schematic illustration of a buffer storing segments of an audio signal, according to an exemplary embodiment of the invention.

FIG. 3B illustrates the processing flow for state 308 "novoice". In an exemplary embodiment of the invention, system 100 attempts to determine if segment 410 represents voice activity (312). If no voice activity is detected (314), for example segment 410 is determined to contain silence, segment 410 is suppressed (316), and not transmitted further. Alternatively, if segment 410 is determined to be voice activity (314), segment 410 is analyzed (318) to determine if it is the voice of a registered user (320). If segment 410 is determined to be the voice of a registered user with a high level of certainty, processing of segment 410 is transferred to state 310 "myburst". Alternatively, if segment 410 is determined not to be the voice of a registered user with a high level of certainty, processing of segment 410 is transferred to state 306 "oburst". If segment 410 does not provide a clear determination regarding conformity to the voice of the registered users, system 100 will calculate (322) an estimated probability value regarding the probability that the segment 410 is voice of a registered user, based on segment 410 and any previous segments. If the estimated probability value is less than a pre-determined threshold value processing of segment 410 is transferred to state 306 "oburst". If the estimated probability value is greater than a pre-determined threshold value processing of segment 410 is transferred to state 310 "myburst".

Figure 3C:
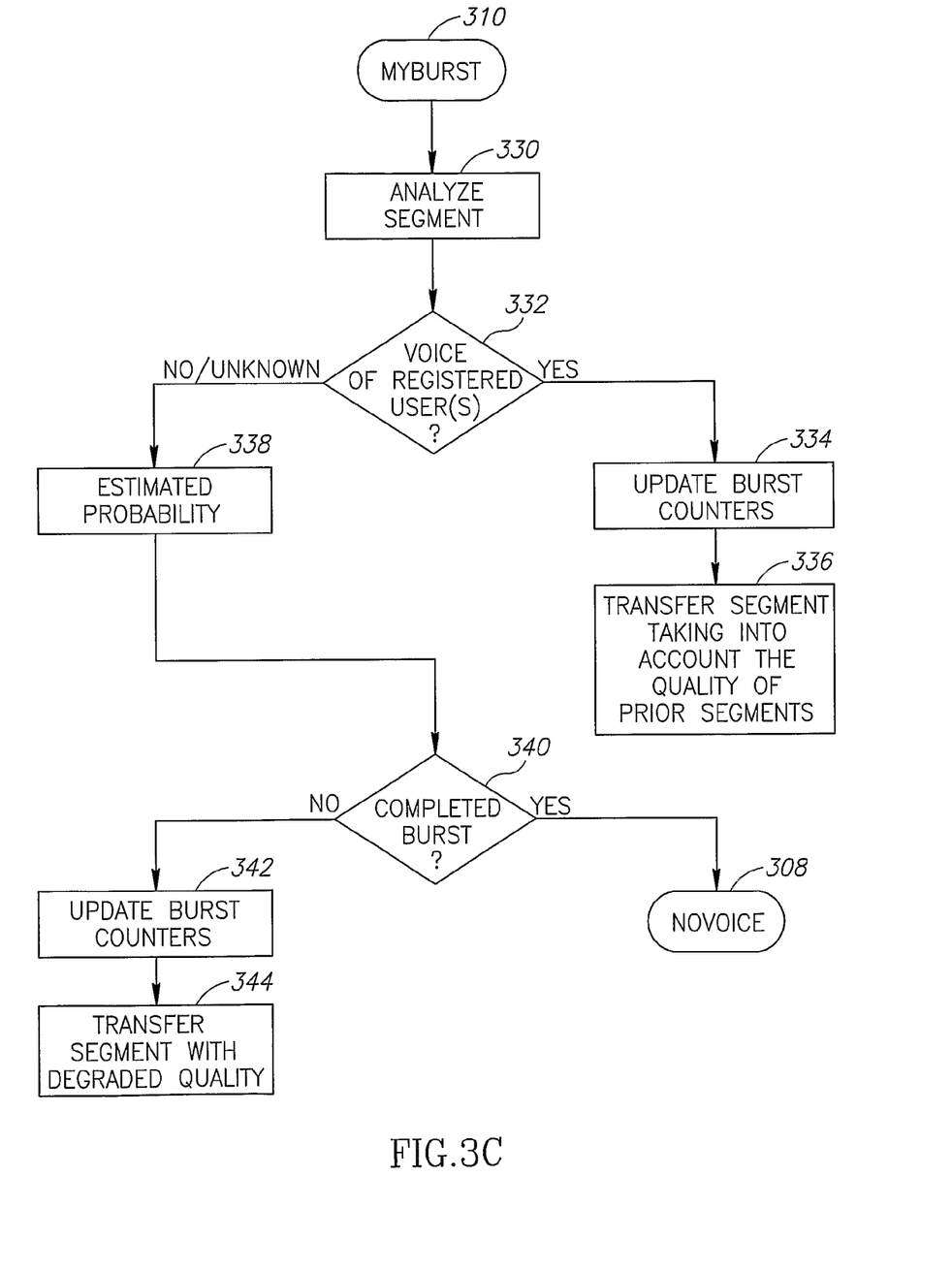
FIG. 3C is a flow diagram of the process of analyzing an audio segment after a registered users voice is detected, according to an exemplary embodiment of the invention.

FIG. 3C illustrates the processing flow for state 310 "myburst". Optionally, if the current segment is determined by state 308 "novoice" to represent voice of a registered user or if previous segments were determined to be voice of a registered user or to probably be voice of a registered user, then the current consecutive segment 410 will be processed in state 310 ("myburst"). Optionally, segment 410 is analyzed (330) to determine (332) if segment 410 is part of current burst 420 with voice of a registered user, for example segment 410 may contain silence but yet be considered part of burst 420 since it is assumed that the user will continue to talk shortly. Optionally, if segment 410 contains silence and is transmitted to the receiver or if segment 410 is suppressed it does not make a difference for the receiver that is listening to segment 410. However there is a difference if segment 410 contains other noise while the user is not speaking. If it is clear that segment 410 is the voice of a registered user, system 100 updates (334) burst counters, which record for current burst 420 details such as the audio parameters found for each segment of burst 420, the number of segments analyzed and other details used to implement a determination regarding the identity of the speaker for burst 420 (e.g. the average probability estimation of each of the segments so far received for burst 420). Optionally, the recorded counters are used to improve the accuracy in estimating the probability of the proceeding segments of burst 420 as belonging to the voice of a registered user.

In an exemplary embodiment of the invention, segment 410 is transferred (336) to the receiver, while taking into account the quality with which the prior segments were transferred. Optionally, even if current segment 410 is clearly determined to be of a registered user its quality is adjusted to form a smooth and continuous audio signal with prior segments, which may have been transferred with a degraded quality as described below.

If it is clear that segment 410 is not voice of a registered user or if it is not clear if segment 410 is from a registered user or not, system 100 estimates (338) a probability value regarding the probability of segment 410 belonging to the burst of a registered user based on segment 410 and previous segments of current burst 420, for example using the values recorded in the burst counters.

In an exemplary embodiment of the invention, the estimated probability value and/or the content of segment 410 are used to determine if segment 410 is part of current burst 420 or if current burst 420 has completed (340) and segment 410 is the beginning of a new burst. If system 100 determines that segment 410 is after the end of burst 420 (e.g. a pause between bursts of speech) or the beginning of a new burst (e.g. with a different speaker), system 100 will transfer control to state 308 ("novoice") to deal with the segment.

If system 100 determines that segment 410 does not complete current burst 420, system 100 updates (342) the burst counters. Optionally, since system 100 is in state 310 ("myburst") there is a presumption that segment 410 is of a registered user and segment 410 is transferred (344) to the receiver. However the quality of segment 410 is optionally, degraded according to the estimated probability, which may even be zero. Optionally, the quality used to transfer segment 410 is proportional to the probability level, for example the more probable that segment 410 is a registered user's voice the better the quality with which it is transferred. In an exemplary embodiment of the invention, each segment of current burst 420 which is identified as voice of a registered user changes the estimated probability value for the proceeding segments, thus the first segment or segments of current burst 420 may be transferred with a reduced quality, and the quality will increase quickly to the full quality of the source as the burst is authenticated. In contrast if a burst is initially assumed to be the voice of a registered user and slowly determined not to be voice of a registered user, it will quickly peter out as the determination is verified. In some embodiments of the invention, the characteristics of the quality that is controlled include volume and/or removal of high order frequencies. Alternatively or additionally, other characteristics may be controlled, for example sample rate.

In some embodiments of the invention, when transferring segment 410 to the receiver, system 100 re-estimates the probability of one or more prior segments or even the proceeding part of all of current burst 420, to verify that the previous decision is correct in view of the current decision regarding segment 410. Optionally, if one or more segments were suppressed and it is determined that they should have been transmitted, system 100 may transfer one or more prior segments from buffer 400 at an excelled rate (relative to the standard transmission rate) to the receiver, to prevent forming a delay in transfer of the conversation. Optionally, the transfer of a small number of prior segments can improve accuracy of system 100 without a person receiving the transmission noticing any deterioration in the signal due to the small size of the segments and the small time interval under consideration. In some embodiments of the invention, when excelling the transfer rate of previously blocked segments, one or more consecutive segments are also transferred at an excelled rate to achieve a smooth signal. In some embodiments of the invention, the transfer rate of the segments is excelled by transferring them at a higher frequency. Alternatively or additionally, the transfer rate is excelled by analyzing the content of the segments and removing or combining and shortening segments which do not affect the speech content being transferred, for example segments or portions of segments, which contain silence or noise.

Figure 3D:
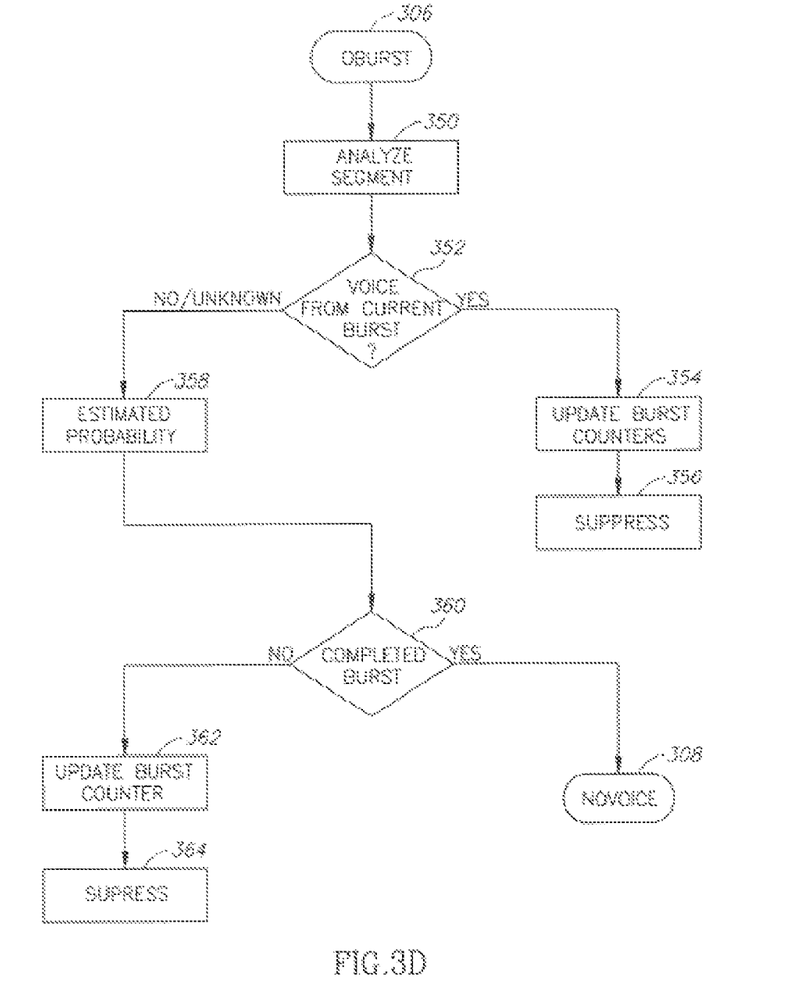
FIG. 3D is a flow diagram of the process of analyzing an audio segment when voice that does not belong to a registered user is detected, according to an exemplary embodiment of the invention.

FIG. 3D illustrates the flow process for state 306 "oburst". Optionally, if previous segments were determined to be voice, however it was determined that the segments do not represent the voice of a registered user, processing of the segments will be transferred to state 306 "oburst". In an exemplary embodiment of the invention, segment 410 is analyzed (350) to determine if segment 410 represents a piece of current burst 420 (352) and is a continuation of the previously identified voice. If it is clear that segment 410 represents the voice of a non registered user, as previously determined the burst counters are updated (354). Optionally, the segment is suppressed (356) so that the receiver does not receive the content of the segment.

In contrast, if it is not clear if segment 410 is the continuation of the non registered user's voice from current burst 420 as previously determined or it is clear that the non registered user's voice has terminated, system 100 will estimate (358) a probability value regarding the content of segment 410. In an exemplary embodiment of the invention, the probability value is compared to a pre-selected threshold value to determine if segment 410 should be suppressed or handled by 308 "novoice".

If it is determined that segment 410 is probably a new burst (360) control will be transferred to 308 "novoice" to continue processing. Optionally, if it is determined that segment 410 is probably part of the current burst of the non-registered user's voice the burst counters are updated (362) and segment 410 is suppressed (364).

In an exemplary embodiment of the invention, system 100 is implemented with an adjustable aggressiveness level, which determines if system 100 should be more stringent or more flexible in deciding if to transfer segments or to suppress them. Optionally, the user can select the aggressiveness level, which will typically alter the threshold values used. Alternatively, the aggressiveness level is determined automatically, for example based on the type of noise. The aggressiveness level especially effects the decisions regarding audio data in a noisy environment or audio data which is not exactly speech, for example laughter and coughs of a registered user. In some embodiments of the invention, system 100 is implemented to allow the user to select if laughter, coughs and other sounds made by the user should be transferred.

Registration

In an exemplary embodiment of the invention, system 100 needs to define which voices are to be transferred and which voices are to be suppressed. This information is provided by registration of authorized users, during registration system 100 records information that is needed to identify a user. In some embodiments of the invention, the registration process may be done by a dedicated process, for example using additional equipment such as a computer which records the voice of the user to analyze the verbal data provided by the user. Alternatively or additionally, the computer may record details about the user, for example age and sex. The results of the registration process are then supplied to system 100.

Alternatively, system 100 may allow a user to activate a registration process using the same equipment as for conducting a conversation, for example by dialing a special key sequence and repeating a specific message. Alternatively or additionally, the registration process may require providing general information about the user, for example sex, and age, by responding to questions presented to the user. In some embodiments of the invention, the registration process may be automatic, for example by learning the characteristics of voice of the first speaker or main speaker in a conversation (e.g. the loudest speaker or speaker that talked the most) and suppressing any other sound or voice during the duration of the conversation. Optionally, system 100 may register more than one speaker, for example all the people that spoke during a learning conversation.

In an exemplary embodiment of the invention, characteristics of a user's voice may include pitch, long term LPC spectrum and pronunciation of specific words. Optionally, the registration process may take into account the language used by the user, since identification of a user is improved when knowing the language used by the user.

Figure 5:
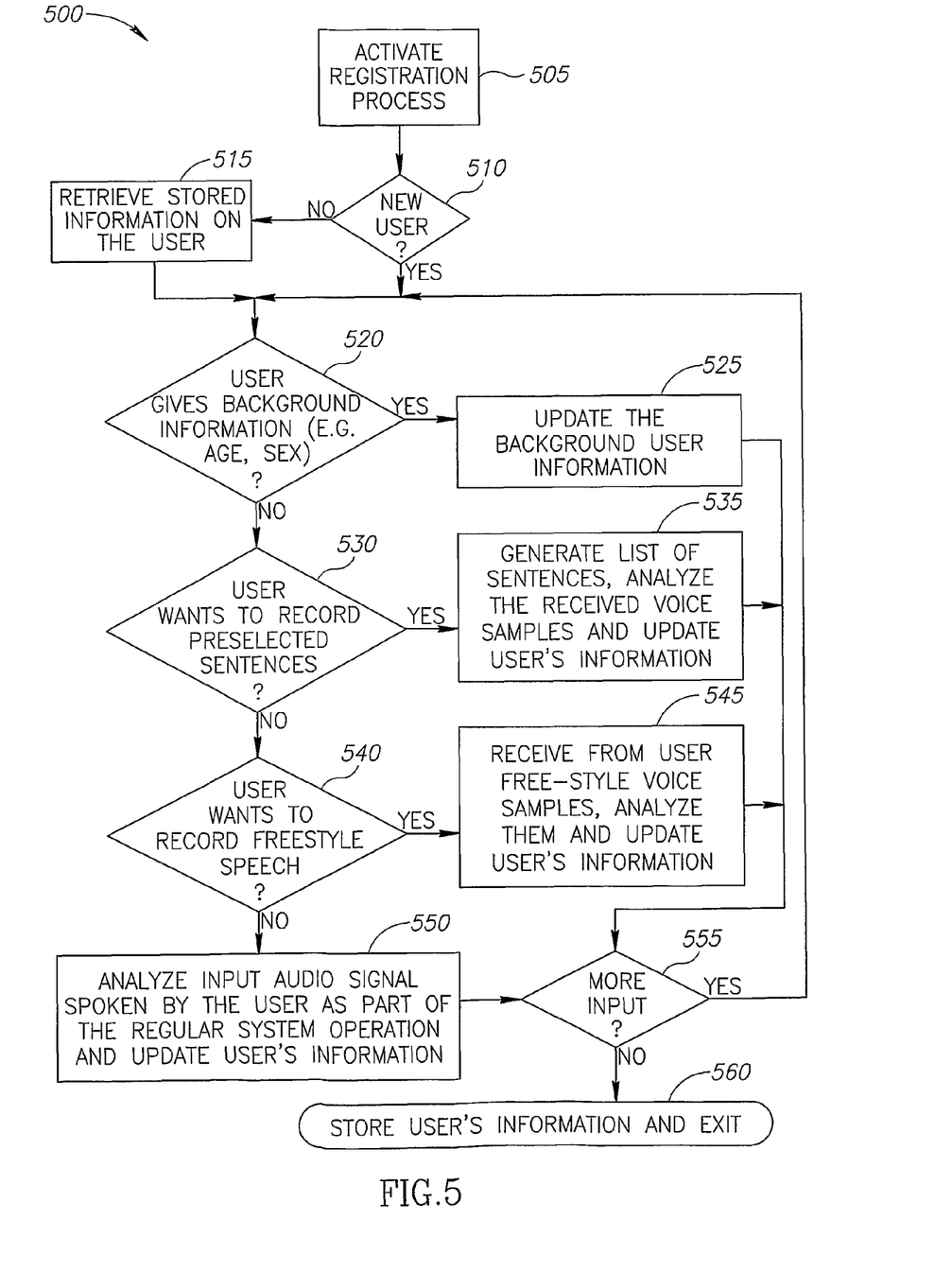
FIG. 5 is a flow diagram of the registration process of a user, according to an exemplary embodiment of the invention.

FIG. 5 is a flow diagram 500 of the registration process of a user, according to an exemplary embodiment of the invention. In an exemplary embodiment of the invention, the registration process (505) for system 100 is activated by the user or activated by system 100 at the beginning of a conversation to automatically register the speaker as mentioned above. Optionally, system 100 checks if the user is a new user (510) or already exists in a registration database on system 100. If the user already exists, system 100 retrieves (515) the stored information to allow the user to amend the previously registered data. Optionally, system 100 checks if the user is interested in updating his/her background information (520), for example the age and sex of the user. If the user is interested in updating background information, system 100 accepts the details to update the information (525), for example using a voice recognition system or verbally providing the user with options that can be selected by key-tones.

Alternatively or additionally, the user is provided with the option of generating a user voice model by repeating specific sentences (530). If the user is interested, he/she is requested to repeat specific sentences (535) and the information is used to create or update a model representing the user voice.

Alternatively or additionally, the user is provided with the option of recording free style speech (540). If the user is interested in performing registration in this form he/she is required to provide (545) free style verbal data to system 100 which will allow system 100 to create a model representing the users voice.

Alternatively or additionally, system 100 can analyze (550) the speech data spoken by the user to automatically form a voice model.

In an exemplary embodiment of the invention, a user may register using one of the above methods and then provide more input (555) by performing another of the above registration methods in order to enhance the accuracy of the voice model created for the user. Alternatively, the registered information can be stored in the registration database of system 100 and the user can exit the registration process (560).

Optionally, an enhanced voice model provides more accurate results when analyzing speech segments. In an exemplary embodiment of the invention, even the knowledge of a user's background by itself can be used to determine possible voice ranges, for example an average pitch value, and rule out other values. Optionally, system 100 will thus be able to identify that an analyzed segment does not belong to the age group of the registered user or to the sex of the user, and rule out the possibility that the voice segment belongs to him or her.

Affinity

In an exemplary embodiment of the invention, system 100 is activated to filter out non-registered users of a communication device. Following is an exemplary list of characteristics and uses demonstrating the affinity between the users and a specific device, which can be implemented using system 100:

1. The sole user of the device, for example a private mobile telephone, which is usable only by the owner.

2. The main users of a device, for example a family telephone line for use by a specific family.

3. Limited scheduled users of a device, for example in a call center a worker that uses the device during specific hours (during his/her shift). Optionally, system 100 will filter out other voices during the shift hours and block the user's voice at other times.

4. Short term users of a device, for example guests at a hotel can be registered to use a device for a limited period, which expires when their stay is over.

5. Selective users, for example a telephone in a public place at a work place that is limited to function only for specific authorized workers.

6. A group of users, for example a group of users conducting a conference call, wherein any other voices are filtered out.

7. Any user, for example a communication device that allows anybody to initiate a conversation, automatically registers the speaker and only transfers their voice during the duration of the call.

8. Physical authorization, for example a communication device that requires plugging in an identity card, which authorizes use by the card holder and blocks voices of any other person.

9. Code authorization, for example a communication device that requires entering a code for each user that will be considered registered for a specific conversation or until cancellation by the user.

In an exemplary embodiment of the invention, a communication device that implements use of system 100 can provide an option of toggling the use of system 100. Optionally, a non registered user can disable the personalized voice detection function so that a non registered user can use the communication device without system 100. Optionally, when a user is interested in sending tones or other sounds which should not be altered, system 100 can be toggled off. In an exemplary embodiment of the invention, system 100 is installed in the communication device and toggled directly on the device, for example using a switch or special key sequence. Alternatively, system 100 is installed in other parts of the network and can be toggled by, for example by transmitting a code (e.g. dialing a specific number), which is intercepted by system 100.

In an exemplary embodiment of the invention, a specific code can be associated with a list of one or more registered users. Optionally, by dialing the code before establishing a call, or conference call, or as part of the establishment of the conference call, the voices of the registered user's in the list will be transferred during the call and any other sound or voice will be suppressed.

Structure

Figure 6:
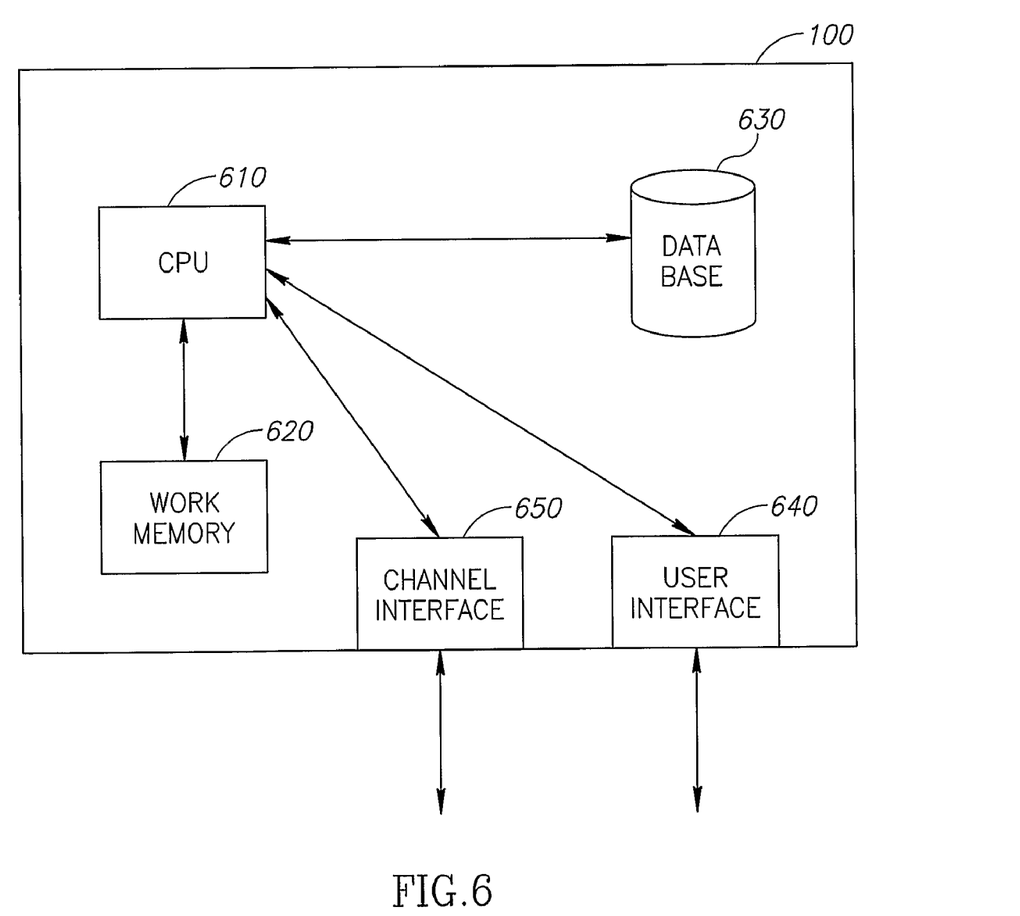
FIG. 6 is a schematic illustration of the main components of a system for analyzing audio data, according to an exemplary embodiment of the invention.

FIG. 6 is a schematic illustration of the main components of system 100 for analyzing audio data, according to an exemplary embodiment of the invention. In an exemplary embodiment of the invention, system 100 comprises a processor, which could be implemented by a central processing unit (CPU), a dedicated processing chip (e.g. a DSP) 610 or a circuit for processing and controlling functionality of system 100. Optionally, system 100 comprises a work memory 620 for storing data while processing audio signals, and a database 630, which provides a non-volatile memory for long term storage of data, for example the entire content of a conversation and registration details of users. In an exemplary embodiment of the invention, system 100 comprises a user interface 640 and a channel interface 650. Optionally, user interface 640 provides interaction with the user regarding the function of system 100, for example to provide a graphical interface showing the state of the system, to allow toggling the state of the system from on to off or vice versa. In an exemplary embodiment of the invention, channel interface 650 accepts audio signals from the user side and transfers the processed audio signal to a communication channel for transferring it to a receiver. In an exemplary embodiment of the invention, system 100 accepts the audio signal provided by channel interface 650, buffers it in work memory 620, processes the audio signal as it is created segment by segment and passes on the processed signal via channel interface 650 to the receiver.

In some embodiments of the invention, system 100 is implemented by a standard general purpose computer, for example a personal computer. Alternatively, system 100 can be implemented by a dedicated device. In some embodiments of the invention, system 100 is implemented in a single encasement at a single location. Alternatively, system 100 may be implemented by multiple pieces in a plurality of encasements and optionally, positioned at multiple locations, for example the database may be stationed at a remote site.

In some embodiments of the invention, system 100 may analyze the audio signal in parallel to other audio analysis systems which may deal with other aspects of analyzing audio signals, for example CODEC processing. Optionally, system 100 may provide analysis information to other audio systems, which may be connected sequentially or any other way to reduce the processing required for those systems.

In an exemplary embodiment of the invention, the idea presented hereinabove may be expanded from audio processing to image processing. Optionally, a video call system can register the face of one or more user's and filter out the background during a call, for example if they are not interested in disclosing their location (e.g. not in their office). In an exemplary embodiment of the invention, the face can be registered by taking a picture of the user with a digital camera for example a web cam or a camera built into a cellular telephone. Optionally, the system will learn identifying characteristics of the user's face as is commonly known in the art. Additionally, filtering out the background of a picture leaving only the user's face and possibly body is commonly practiced in the art. Optionally, the background may be replaced with a predetermined background that is selected by the user.

In an exemplary embodiment of the invention, the image processing system can be used to reduce bandwidth since the background is filtered out. Optionally, many of the options that are applicable to audio processing are also applicable to image processing, for example toggling the system on and off, and automatic registration (e.g. during the beginning of the call).

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

The invention claimed is:

1. A method of transferring to a receiver in real time content of segments of an audio signal transmission of a call, the method comprising:
   receiving from a call an audio signal as a sequence of segments including segments that have user characteristics that were registered to identify voices of users and other segments that do not have registered user characteristics;
   analyzing at least one segment of the received audio signal to determine if it contains voice activity;
   determining a probability level that the voice activity of the analyzed segment is of a registered user according to the registered user characteristics; and
   selectively transferring during the call the content of a segment to a receiver if the determined probability level is greater than a threshold value;
   wherein the content of segments of the same call, for which the determined probability level is less than the threshold value, is suppressed completely or partially.

2. A method according to claim 1, wherein said segments are selected to comprise a single syllable.

3. A method according to claim 1, wherein said, segments are selected to comprise an interval of the audio signal smaller than 0.1 seconds.

4. A method according to claim 1, wherein said selectively transferring comprises adjusting the quality level of the audio segment according to the determined probability level.

5. A method according to claim 4, wherein adjusting the quality level comprises raising or lowering the volume of the audio signal in the segment.

6. A method according to claim 1, wherein said selectively transferring comprises transferring previously blocked segments responsive to the determination for a consecutive segment.

7. A method according to claim 6, wherein said previously blocked segments are transferred at a higher rate than the standard transfer rate of segments.

8. A method according to claim 1, wherein said probability level of a segment is affected by the selective transfer of segments prior to the current segment.

9. A method according to claim 1, further comprising filtering out noise from each segment before analyzing the segment.

10. A method according to claim 1, further comprising filtering out noise from each segment after analyzing the segment.

11. A method according to claim 1, further comprising performing source separation to the signal in a segment creating multiple segments before analyzing the segment and analyzing the multiple segments independently.

12. A method according to claim 1, further comprising analyzing the strongest signal in a segment with multiple audio signals, while taking into account prior segments.

13. A method according to claim 1, further comprising inserting an audio signal into a segment to indicate amendments to the segment.

14. A method according to claim 1, wherein said transferring is through a communication system.

15. A method according to claim 1, wherein said characteristics comprise voice patterns of the user.

16. A method according to claim 1, wherein said characteristics comprise general information about the user.

17. A method according to claim 1, wherein said selectively transferring allows voice activity of any user.

18. A method according to claim 1, wherein said selectively transferring allows voice activity of a group of users with a common characteristic.

19. A method according to claim 1, wherein said selectively transferring reduces bandwidth of transmissions through a communication network.

20. A method according to claim 1, wherein said probability level becomes more accurate as the audio signal is processed.

21. A method according to claim 1 further comprising:
allowing a user to select a suppression level by which unwanted sounds are suppressed.

22. A system for transferring to a receiver in real time content of segments of an audio transmission of a call, the system comprising:
a processor to process data of the real time audio transmission and to control the system;
a memory to serve as a work area for said processor;
a channel interface to provide an audio signal for processing and to transfer the processed audio signal to a receiver;
wherein said system is adapted to:
receiving from a call an audio signal from the channel interface as a sequence of segments including segments that have user characteristics that were registered to identify voices of users and other segments that do not have registered user characteristics;
analyzing with the processor at least one segment of the received audio signal to determine if it contains voice activity;
determining a probability level that the voice activity of the analyzed segment is of a registered user according to the registered user characteristics;
and selectively transferring during the call the contents of a segment to the receiver if the determined probability level is greater than a threshold value;
wherein the contents of segments of the same call, for which the determined probability level is less than the threshold value, is suppressed completely or partially.

23. A system according to claim 22, wherein said system provides an indication at a user communication device if it is activated.

24. A system according to claim 23, wherein said indication gives indication if the user is recognized as a registered speaker.

25. A system according to claim 22 further comprising a database memory to store data provided to the system for processing by said processor.

26. A system according to claim 22 further comprising a user interface to communicate with the user.

27. A system according to claim 22, wherein said processor performs source separation to the signal in a segment creating multiple segments before analyzing the segment and analyzing the multiple segments independently.

28. A processor for transferring to a receiver in real time content of segments of an audio signal transmission of a call, the processor comprising:
an audio signal interface; and
circuitry operative to:
receive from a call through the audio signal interface an audio signal as a sequence of segments including segments that have user characteristics that were registered to identify voices of users and other segments that do not have registered user characteristics;
analyze at least one segment of the received audio signal to determine if it contains voice activity;
determine a probability level that the voice activity of the analyzed segment is of a registered user according to the registered user characteristics; and
selectively transfer through the audio signal interface during the call the content of a segment to a receiver if the determined probability level is greater than a threshold value;
wherein the content of segments of the same call, for which the determined probability level is less than the threshold value, is suppressed completely or partially.

* * * * *

UNITED STATES PATENT AND TRADEMARK OFFICE
CERTIFICATE OF CORRECTION

| | | |
|---|---|---|
| PATENT NO. | : 8,175,874 B2 | Page 1 of 1 |
| APPLICATION NO. | : 12/092578 | |
| DATED | : May 8, 2012 | |
| INVENTOR(S) | : Shaul Simhi | |

It is certified that error appears in the above-identified patent and that said Letters Patent is hereby corrected as shown below:

Title Page, Item (12) "Shimhi" should read --Simhi--.

Title Page, Item (75) Inventor "Shaul Shimhi" should read --Shaul Simhi--.

Signed and Sealed this
Fifth Day of June, 2012

David J. Kappos
*Director of the United States Patent and Trademark Office*